United States Patent [19]

Vanorden

[11] Patent Number: 5,598,659
[45] Date of Patent: Feb. 4, 1997

[54] DIVING/JUMPING FISHING LURE AND METHOD

[76] Inventor: Larry E. Vanorden, 161 SE. 5th Ave., #2, Delray Beach, Fla. 33483

[21] Appl. No.: 544,829

[22] Filed: Oct. 18, 1995

[51] Int. Cl.⁶ .................................................. A01K 85/16
[52] U.S. Cl. ..................... 43/42.23; 43/42.45; 43/42.39
[58] Field of Search ............................. 43/42.45, 42.47, 43/42.39, 42.22, 42.23; D22/132

[56] References Cited

U.S. PATENT DOCUMENTS

| | | | |
|---|---|---|---|
| D. 142,160 | 8/1945 | Baldwin | D22/132 |
| 1,114,137 | 10/1914 | Heddon | 43/42.23 |
| 1,233,507 | 7/1917 | Reynolds | 43/42.23 |
| 1,297,617 | 3/1919 | Welles | 43/42.15 |
| 1,499,819 | 7/1924 | Goble | 43/42.15 |
| 1,744,366 | 1/1930 | Davenport | 43/42.44 |
| 2,847,791 | 8/1958 | Simmons | 43/42.26 |
| 3,393,465 | 7/1968 | Powell | 43/42.28 |

FOREIGN PATENT DOCUMENTS

| | | | |
|---|---|---|---|
| 483534 | 5/1952 | Canada | 43/42.23 |

*Primary Examiner*—J. Elpel
*Attorney, Agent, or Firm*—Dominik & Stein

[57] ABSTRACT

A fishing lure having an elongated one-piece body with a weighted head and a trailing hook, which hook is camouflaged by tassels that resemble the tentacles of a squid is disclosed. The body contains a V-shaped diving trough that begins near the tail and increases in depth towards the head of the lure. The user of the this lure can select a variety of diving patterns for the lure by selecting or adjusting the point of attachment between the lure and the fishing line. Portions of the body may be colored to attract fish.

25 Claims, 2 Drawing Sheets

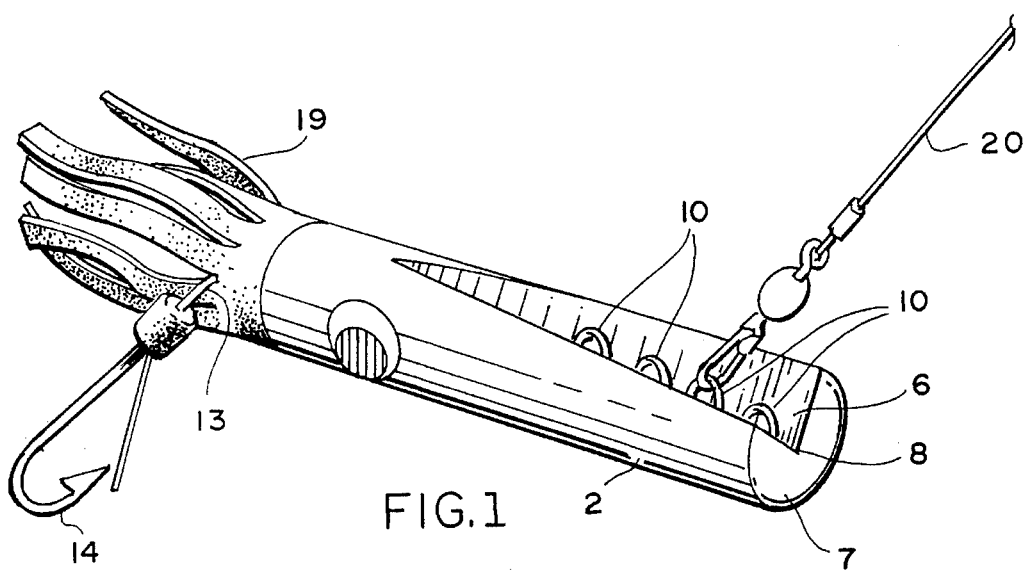
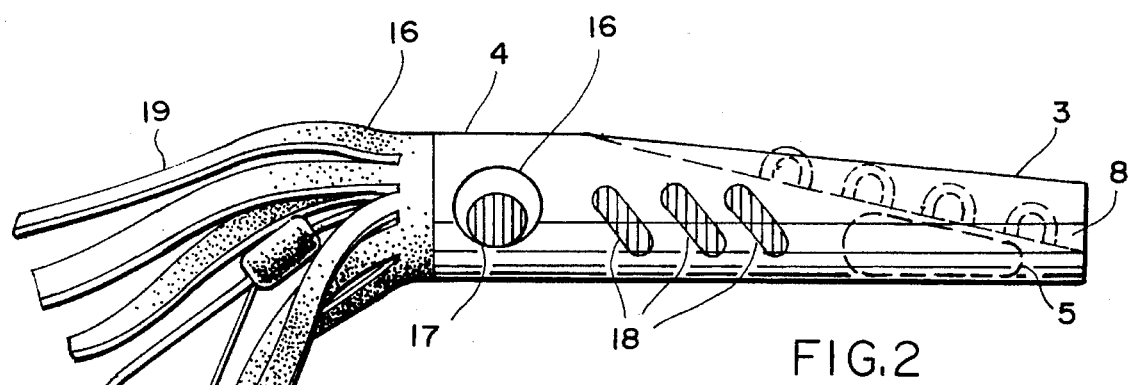
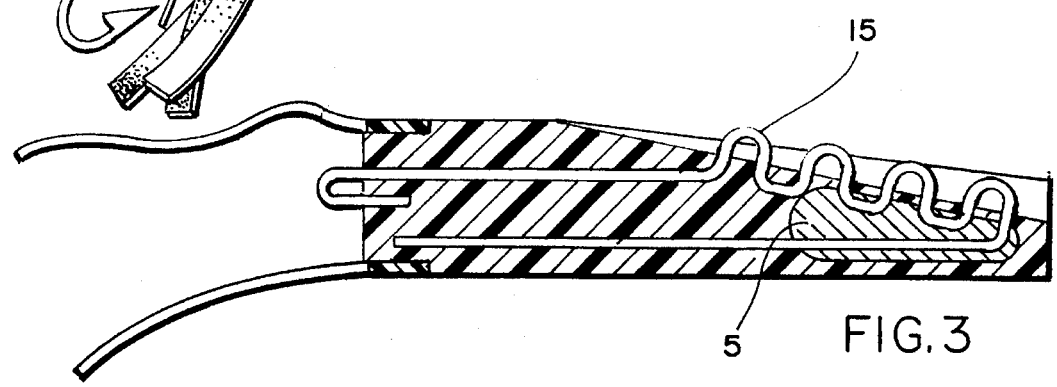
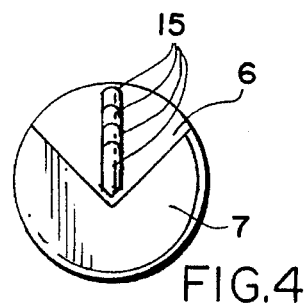

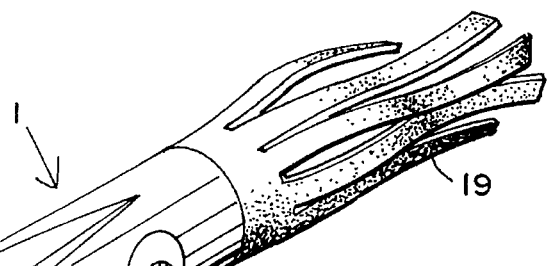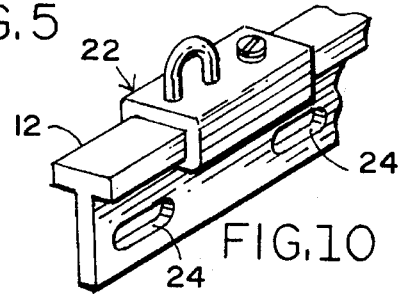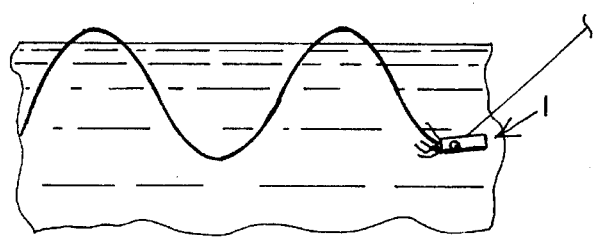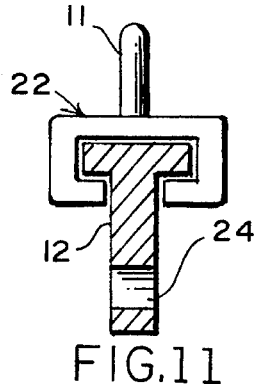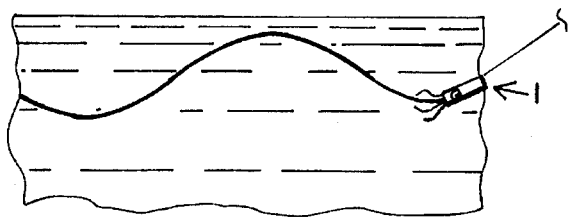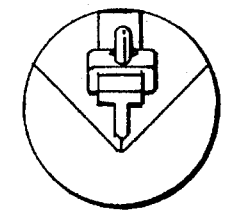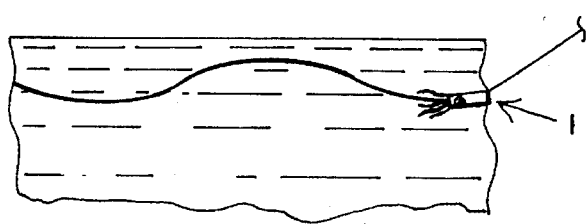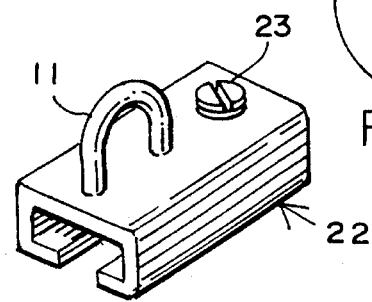

DIVING/JUMPING FISHING LURE AND METHOD

FIELD OF THE INVENTION

The present invention is directed to fishing lures. More particularly, the invention relates to a new and improved fishing lure having an elongated, one-piece body with a trailing hook, which hook is camouflaged by tassels that resemble the tentacles of a squid. The user of the present lure can select a variety of diving patterns for the lure by selecting or adjusting the point of attachment between the lure and the fishing line. Portions of the body may be colored to attract fish.

BACKGROUND OF THE INVENTION

Many fishing lures have means for causing erratic movement as well as means for attracting fish. These devices, however, are difficult and expensive to manufacture, difficult to maintain, and wear out easily. In addition, the lures do not resemble live bait, and the resulting erratic movements achieved by the lures often cannot be adjusted. For these and other reasons, these lures are unsatisfactory. The prior art is generally found in Class 43, Subclasses 42, 42.04, 42.1, 42.23, 42.39, and 42.49. Examples of the prior art are discussed below.

Powell (U.S. Pat. No. 3,393,465) reveals a lure comprising a hollow, cylindrical body with a weighted angularly-disposed front end with the leader connected behind the front end to impart erratic movement. Powell, however, cannot be "programmed" for a particular diving pattern. Additionally, Powell lacks the V-shaped diving trough and the adjustable point of attachment for the leader wire.

Olson (U.S. Pat. No. 4,453,333) discloses a fishing lure having selective position of the leader to the lure, a covered, beaded chain to the hook, and a ballast weight. While the multiple points of attachment may be used to adjust the performance of the lure, there appears to be little interaction between the weighted portion and the point of attachment. Furthermore, the lure lacks any hydrodynamic mechanism for diving.

Wade (U.S. Pat. No. 2,283,960) discloses a squid-like lure that features an inclined forward surface with a plate containing a plurality of holes for attaching the leader wire. The lure attempts to achieve a darting action as it is pulled through the water, with the amplitude of the action varying according to the point of attachment. Wade does not have a V-shaped diving trough. Furthermore, the use of the holes in the plate do not allow the lure to pivot about the leader wire, which is allowed with the present invention. Finally, there is no weight to interact and work against the adjustable point of attachment.

Welles (U.S. Pat. No. 1,297,617), Davenport (U.S. Pat. No. 1,744,366), Wagner (U.S. Pat. No. 2,618,096), Wittmann (U.S. Pat. No. 2,736,124) and Pagani (U.S. Pat. No. 4,161,078) all disclose multiple points of connection with the fishing line for adjustment of depth. There is, however, no disclosure of a darting-like action that is achieved through the feature. In fact, Welles, specifically, and the others, generally, aim to achieve a "uniform depth" as determined by the point of attachment.

Oney (U.S. Pat. No. 3,363,359) discloses a lure having a weight on a flat plate which causes the lure to progress with vertical zigzag darting movements. The weight, however, is intended to achieve essentially a horizontal positioning of the lure in the water before trolling is initiated, and not to assist in the diving function. Again, the lure does not have a V-shaped diving trough, nor multiple points of attachment.

Kresl (U.S. Pat. No. 5,197,221) discloses a lure that oscillates vertically and achieves a sine wave-like action as the lure is advanced through the water. The lure achieves its movement through the use of a "wing" and not through a diving trough. While the overall dive pattern of the lure may be similar to the present invention, it appears that the Kresl lure will continually spin while moving through the water. Additionally, there is no means by which the diving pattern may be adjusted.

Toivonen (U.S. Pat. No. 3,981,096) discloses a fishing lure that can be used for jigging, trolling or casting. The lure can be used to achieve an erratic, swimming effect, but the lure's structure appears to be unrelated to present invention, and the lure cannot be "programmed" to achieve different diving patterns.

SUMMARY OF THE INVENTION

The present invention relates to a new and improved fishing lure having a normally solid, one-piece body with a trailing hook, which hook is camouflaged by tassels that resemble the tentacles of a squid. The body of the lure is cylindrical, but with a V-shaped diving trough that begins near the tail and increases in depth towards the head of the lure. The body is made of a high strength, hard plastic, or of an equivalent material which is of relatively neutral to slightly negative buoyancy. There are multiple places to attach the leader wire, all of which are located along the base of the V-shaped diving trough. Optionally, the base of the diving trough contains a fully adjustable track to allow the leader wire to be attached at any point along the diving trough.

The head of the lure contains a weight so that the lure has a natural tendency to dive head first towards the bottom when there are no other active forces. The head of the lure is non-fluid dynamic, thus, helping to induce randomness in the movement of the lure as it moves through the water. The V-shaped trough works with the weighted head to generate a downward pulling force, which acts in contravention to the upward forces that result from the point of attachment between the lure and the leader wire. In addition, the tassels produce a drag effect which can also alter the interaction between the diving trough and the weighted head.

The lure also pivots about the leader wire to result a side-to-side motion as the lure ascends and descends. The lure utilizes a metal member to form an eyelet for securing the leader wire to the lure. Because this metal member has a circular cross section, the wire leader can pivot about the eyelet. The path of the leader wire while pivoting is uninterrupted by any portion of the lure, which contrasts with some prior art which have metal plates to preclude the pivoting action. Additionally, the shape of the diving trough enhances the side-to-side motion of the lure, because once the lure pivots about the leader wire, one of the sides comprising the V-shaped diving trough acts as a fluid dynamic guide causing the lure to take a detour from the directly forward path.

The method of the invention contemplates attaching the leader wire to different points along the V-shaped trough, the user can achieve different "diving" patterns with the lure as the user pulls the lure through water, either as the result of a trolling movement or a reeling-in movement. For example, attaching the leader to the forward most position, casting out the lure, and then reeling it will cause the lure to undergo relatively shallow dives. Attaching the leader to the rear most position results in deep dives followed by jumps across the surface of the water. Note that when used herein, "diving pattern" is intended to include both the descents and assents, including any jumping or skipping across the surface, of the lure as it moves through the water.

Also, portions of the body may be colored to attract fish. The coloration may be achieved by painting the exterior sides of the lure, or else by enclosing colored panels in the lure during the molding process.

In view of the foregoing it is a principle object of the present invention to provide a relatively simple, inexpensive, commercially feasible artificial lure having a cylindrical body with a weighted head and a diving trough, wherein the point of attachment can be adjusted to achieve a variety of diving patterns.

A related object of the present invention is to provide a cost-effective diving trough that is completely integrated within the body of the lure.

Yet another object of the present invention is to provide a lure which appears to be a live organism native to the waters being fished.

Yet another object of the present invention is to provide a single lure which can be programmed to achieve a variety of different diving patterns without the fisherman having to change lures.

Yet another object of the present invention is to provide a single lure that can be used as a surface lure, as well as a trolling lure, and even a jigging lure.

BRIEF DESCRIPTION OF THE ILLUSTRATIVE DRAWINGS

Further objects and advantages of the present invention will become apparent from the following description of an illustrative embodiment, taken in conjunction with the accompanying drawings, in which:

FIG. 1 is a perspective view of the fishing lure showing most of the key features illustrative of a preferred embodiment;

FIG. 2 is a side view of the same lure in FIG. 1;

FIG. 3 is a cut-away side view of the lure in FIG. 1;

FIG. 4 is a front view of the lure in FIG. 1;

FIG. 5 is a perspective view of the fishing lure with an adjustable means for attaching the lure to fishing line;

FIG. 6 is a perspective view of the fishing lure with several distinct points of attachment for securing the lure to fishing line;

FIG. 7 illustrates the large-amplitude diving pattern that is achieved with the lure is secured to fishing line at the rearward most point of attachment;

FIG. 8 illustrates the medium-amplitude diving pattern that is achieved when the lure is secured to fishing line at a point of attachment intermediate the head and tail;

FIG. 9 illustrates the small-amplitude diving pattern that is achieved when the lure is secured to fishing line at the forward most point of attachment;

FIG. 10 illustrates the slidable member and the adjustable track along which it slides;

FIG. 11 illustrates is a front view of the slidable member and the adjustable track;

FIG. 12 illustrates a front view of the lure in FIG. 5; and

FIG. 13 illustrates a perspective view of the slidable member.

DESCRIPTION OF A PREFERRED EMBODIMENT

As noted in the drawings, the preferred embodiment of the lure 1 has a cylindrical-like body 2 with a head 3 and a tail 4. The head 3 of the body 2 contains a diving weight 5 and has a flat, non-fluid dynamic face 7. The body 2 contains a V-shaped diving trough 6 that commences at the head 3 and tapers off toward the tail 4. The body 2 is solid and is made of a high strength plastic, or other comparable material which has a relatively neutral to slightly negative buoyancy. A hook leader 13 connects a hook 14 to the tail 4. In the bottom 8 of the V-shaped diving trough 6 is the dive pattern selector 10.

The dive pattern selector 10 may be comprised of more than one different selector means. First, the dive pattern selector 10 may consist of a series of eyelets 11, as shown in FIG. 6, which eyelets offer discrete points of attachment for securing the lure 1 to fishing line. Note that the series of eyelets 11 can be created by several separate, independent eyelets, or, as shown in FIG. 3, can be created by a single metal member 15 which has been shaped to achieve a serpentine pattern, which member is then molded into the lure during the manufacturing process. Second, the dive pattern selector 10 may be comprised of a single eyelet 11 attached to a slidable member 22 that can be adjusted along an adjustable track 12 which is permanently secured to the bottom 8 of the V-shaped trough 6, thus, allowing for a large plurality of adjustments. The slidable member 22 may be secured at any point along the adjustable track 12 by tightening the locking screw 23. The adjustable track 12 is permanently secured to the lure 1 during the molding process when the liquid plastic passes through the securing means 24 of the track 12 and then subsequently hardens about the track 12 and securing means 24, preventing any slippage in said track 12.

The lure 1 can also contain decorative features 16. For example, the lure 1 may be manufactured to closely resemble a squid, with two eyes 17 and tentacle-like tassels 19. The lure 1 may also contain body stripes 18, the colors of which can be coordinated with the colors of the tentacle-like tassels 19. The tassels 19 also serve the purpose of creating a drag on the lure 1 as it moves through the water. Other forms of a drag can be utilized, including feathers, spinners, grass skirts, and other drag inducing mechanisms.

In the operation of the device, the user will secure his or her fishing line 20 to the eyelet 11 of the lure 1. The user may choose one of the preselected, spaced eyelets 11 as shown in FIG. 6, or the user may use the single eyelet 11 on the adjustable track 12 as shown in FIG. 5. Varying the position at which the fishing line 20 is secured to the lure 1, by either selecting a different eyelet 11 as shown in FIG. 6 or adjusting the eyelet 11 on the track 12 as shown in FIG. 5, will vary the diving pattern of the lure 1 during operation. The variation is achieved because the diving weight 5 creates a downward moment about the point of attachment (i.e. the selected eyelet 11) which in turn varies the position of the V-shaped diving trough 6 as the lure 1 moves through the water. The V-shaped diving trough 6 is fluid dynamically shaped to force the lure 1 on a downward path. However, at the bottom of the dive, the downward diving forces will be overcome by the upward forces created by the fishing line 20, and thus, the lure 1, will change directions and assume an upward path. At some point in the ascendancy, the downward forces induced by the diving weight 5 will overcome the upward forces created by the fishing line 20, resulting in a change of directions and causing the lure 1 to descend. The amplitude of the variations in the diving patterns will increase as the point of attachment between the lure 1 and the fishing line 20 is moved from the head 3 towards the tail 4. In addition, the amplitude and pattern of the dive is affected by the tentacle-like tassels 19 that create drag forces on the lure 1, and thus, affect the dynamic forces acting on the lure 1. The path of the lure 1 can also be influenced by the actions of the user. For example, a sharp pull on the fishing line 20 may cause the lure to move upward, and even jump in some cases. Alternatively, relaxing all tension on the fishing line 20 will cause the lure 1 to sink toward the bottom of the body of water because the diving weight 5 gives the lure 1 an overall negative buoyancy and, thus, causes the lure 1 to sink when no other forces are present.

It will be understood that various changes in the details, materials and arranges of parts which have been herein described and illustrated in order to explain the nature of the invention, may be made by those skilled in the art within the principle and scope of the present invention as expressed in the appended claims.

What is claimed is:

1. An artificial lure for use in a body of water by a fisherman with fishing line, comprising in combination:

a cylindrical body having both a head and a tail;

a fish hooking means;

said body having a V-shaped diving trough that commences at the head of the body and tapers off toward the tail;

said head having a diving weight to induce a diving action;

said V-shaped diving trough having a dive pattern selector means;

whereby the fisherman may choose a particular diving pattern by adjusting the point at which the fishing line is tied to the dive pattern selector means along the V-shaped diving trough between the head and the tail of the body.

2. The lure of claim 1 above, wherein the dive pattern selector means comprises in combination:

a plurality of eyelets spaced along the "V" of the V-shaped diving trough, whereby the fisherman may choose a particular diving pattern by tying the fishing line to the desired eyelet between the head and the tail of the body.

3. The lure of claim 1 above, wherein the dive pattern selector means comprises:

an eyelet on a moveable track;

said track being located along the "V" of the V-shaped diving trough, whereby the fisherman may choose a particular diving pattern by tying the fishing line to the eyelet and adjusting the eyelet to a desired location along the track between the head and the tail of the body.

4. The lure of claim 1 above, wherein the dive pattern selector means comprises in combination:

a single eyelet spaced along the "V" of the V-shaped diving trough, whereby the diving pattern is determined by the relative location of the eyelet along the "V" between the head and the tail of the body.

5. The lure of claim 1 above, wherein the fish hooking means comprises in combination:

a hook leader that is attached to the tail of the body; and a hook, whereby the hook can be secured to the tail of the body by way of the hook leader.

6. The lure of claim 5 above, wherein the body of the lure has:

tentacular tassels that camouflage the hook and protect it from any suspended debris that may be in the body of water being fished;

two eyes; and a plurality of stripes.

7. The lure of claim 1 above, further comprising:

tassels resembling tentacles, which tassels camouflage the fish hooking means and protect it from any suspended debris that may be in the body of water being fished.

8. The lure of claim 7 above, wherein the body of the lure is adorned with:

two eyes; and a plurality of stripes.

9. The artificial lure of claim 1 wherein the head of the body has a flat face that increases the randomness of the movement of the lure as it is pulled through the body of water being fished.

10. An artificial lure for use in a body of water by a fisherman with fishing line, comprising in combination:

a elongated body having both a head and a tail;

said tail having a fish hooking means;

drag means adjacent the fish hooking means;

said body having a diving trough having a bottom that commences near the tail of the body and increases in depth as said trough runs towards the head;

said head having a diving weight to induce a diving action;

said diving trough having a plurality of eyelets laterally spaced along the bottom of the diving trough;

whereby the fisherman may adjust the pattern of movement of the lure in operation by tying the fishing line to one of the eyelets between the head and the tail of the body.

11. The lure of claim 10 above, wherein the body of the lure is adorned with:

two eyes; and a plurality of stripes.

12. The artificial lure of claim 10 wherein the head of the body has a flat face that increases the randomness of the movement of the lure as it is pulled through the body of water being fished.

13. The artificial lure of claim 10 wherein the diving trough is V-shaped.

14. The artificial lure of claim 10 wherein the drag means is comprised of long flowing tassels that camouflage the fish hooking means and protect it from any suspended debris that may be in the body of water being fished.

15. An artificial lure for use in a body of water by a fisherman with fishing line, comprising in combination:

a elongated body having both a head and a tail;

said tail having a fish hooking means;

drag means adjacent the fish hooking means;

said body having a diving trough having a bottom that commences near the tail of the body and increases in depth as said trough runs towards the head;

said head having a diving weight to induce a diving action;

said diving trough having a track being located along the bottom of the diving trough, an eyelet mounted to and being slidable along the track, whereby the fisherman may adjust the pattern of movement of the lure in operation by tying the fishing line to the eyelet and adjusting the eyelet to a desired location along the track between the head and the tail of the body.

16. The lure of claim 15 above, wherein the body of the lure is adorned with:

two eyes; and a plurality of stripes.

17. The artificial lure of claim 15 wherein the head of the body has a flat face that increases the randomness of the movement of the lure as it is pulled through the body of water being fished.

18. The artificial lure of claim 15 wherein the diving trough is V-shaped.

19. The artificial lure of claim 15 wherein the drag means is comprised of long flowing tassels that camouflage the fish hooking means and protect it from any suspended debris that may be in the body of water being fished.

20. The method of obtaining different diving patterns with a single lure to be used with a fishing line by a fisherman in a body of water, said lure having an elongated body with both a head and a tail, a fish hooking means, said tail having drag-inducing means, said body having a diving trough with a bottom that commences at the head of the body and tapers off toward the tail, said diving trough having one or more eyelets laterally spaced along the bottom of the diving trough, said eyelets corresponding to preselected diving patterns, and said head having a diving weight to induce a diving action, said method comprising the steps of:

choosing a particular diving pattern based on the dive pattern to be generated;

tying the fishing line to one of the eyelets between the head and the tail of the body, which eyelet corresponds to the desired diving pattern; and casting and reeling, or trolling with, the lure to cause the lure to move through the water, thus, generating the desired diving pattern.

21. In the method of claim 20, said lure having a drag-inducing means, comprising long flowing tassels that camouflage and protect the fish hooking means.

22. In the method of claim 20, said lure having a diving trough in the shape of a "V".

23. The method of obtaining different diving patterns with a single lure to be used with a fishing line by a fisherman in a body of water, said lure having an elongated body with both a head and a tail, a fish hooking means, said tail having drag-inducing means, said body having a diving trough with a bottom that commences at the head of the body and tapers off toward the tail, said diving trough having a track being located along the bottom of the diving trough, an eyelet mounted to and being slidable along the track with relative position corresponding to preselected diving pattern, said head having a diving weight to induce a diving action, said method comprising the steps of:

choosing a particular diving pattern based on the dive pattern to be generated;

tying the fishing line to the eyelet;

adjusting the eyelet to the desired location along the track between the head and the tail of the body, which position corresponds to the desired diving pattern; and casting and reeling, or trolling with, the lure to cause the lure to move through the water, thus, generating the desired diving pattern.

24. In the method of claim 23, said lure having a drag-inducing means, comprising long flowing tassels that camouflage and protect the fish hooking means.

25. In the method of claim 23, said lure having a diving trough in the shape of a "V".

\* \* \* \* \*